J. Dunkley,
Wind Wheel;
No. 486.
Fig. 1 Reissued Aug. 25, 1857
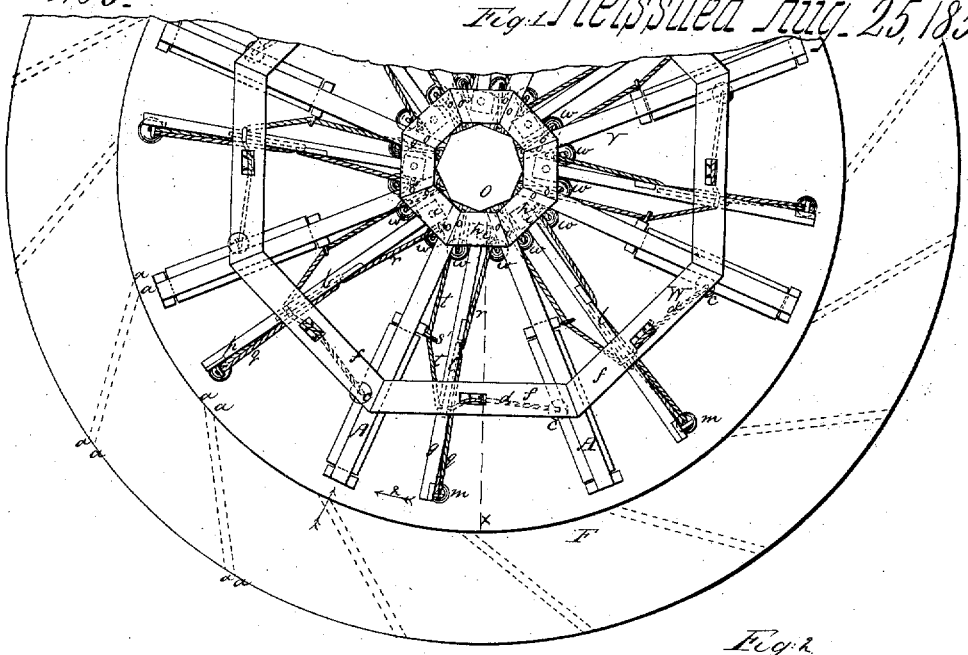
Fig. 2
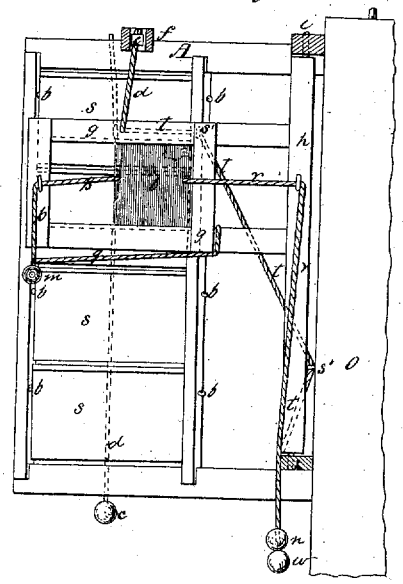
Fig. 3
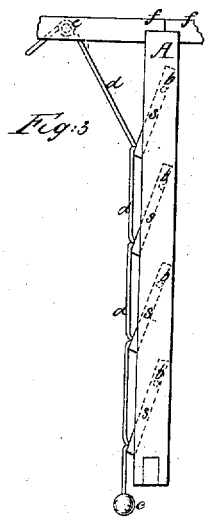
N. PETERS, PHOTO-LITHOGRAPHER, WASHINGTON, D. C.

UNITED STATES PATENT OFFICE.

JOSEPH DUNKLEY, OF CARROLLTON, MISSOURI.

IMPROVED AUTOMATIC REGULATOR FOR WIND-WHEELS.

Specification forming part of Letters Patent No. 16,378 dated January 13, 1857; Reissue No. 486, dated August 25, 1857.

*To all whom it may concern:*

Be it known that I, JOSEPH DUNKLEY, of Carrollton, in the county of Carroll and State of Missouri, have invented certain new and useful Improvements in Wind-Wheels; and I do hereby declare that the following is a full, clear, and exact description of the same, reference being had to the accompanying drawings, and to the letters of reference marked thereon, in which—

Figure 1 is a top view of the apparatus. Fig. 2 is a vertical section on line *x x*, Fig. 1. Fig. 3 is an edge view of a single slatted arm, looking in the direction shown by arrow 1.

Similar characters of reference in the several figures denote the same part.

The nature of my invention consists in the construction of an automatic governor in the manner hereinafter to be set forth.

In the drawings, W revolves horizontally within a frame, F, by the action of air through passages indicated by dotted lines *a a* in Fig. 1. The arms A of the wheel on which the wind acts contain each a series of slats, *s*, swung on pins *b*, and kept down by a weight, *c*, at the extremity of a cord, *d*, attached to each of the slats, as shown in Fig. 3. This cord passes over a pulley, *e*, in the upper brace, *f*, of the arms, and is attached to a swinging wing, *g*, so that the movement of the wing in the direction of arrow 2 will lift the lower edges of the slats, and by permitting the passage of the wind will retard the motion of the wheel. The swinging wing *g* is attached to a shaft, *h*, turning on pins *i*. In the wing is a slide, *l*, capable of movement to and from the center of the wheel in grooves of top and bottom pieces of the wing *g*. To this slide is attached two weights, *m* and *n*, by cords, the former drawing outward and the latter inward, the action of these weights being such that the gravity of weight *m*, when allowed to act freely, will draw the slide *l* to the outer portion of the wing; and then said weight *m* is lifted by centrifugal force to the position shown in Fig. 2, weight *n* will draw the slide into the position shown by that figure. The cords connected with these two weights are shown at *p q* for weight *m*, and *r* for weight *n*. The wing is also acted upon by another weight, *w*, attached to cord *t*, which passes from wing *g*, through a staple, *s'*, on the main arm and a staple, *s''*, on the shaft *o*.

The construction as above described will, in connection with the following, indicate the operation of the governor. At the starting of the wheel the gravity of weight *w* will draw the slide *l* to the outer portion of wing *g*, which wing will occupy a position nearly midway between two main arms of the wheel, the weight *c*, in connection with the resistance of air to the side *l*, overcoming the weight *w*, the slats *s* being held close against each other by the said weight *c*, and thus receiving the full force of the current of air through the air-passages of the frame. As the velocity of the wheel increases, weight *m* gradually rises, being held by cord *q*. This rise of weight *m* causes weight *n* to act to draw the slide *l* inward, and as the slide *l* moves inward the arm of the resistance of the wing *g* to the air behind diminishes, causing the weight *w* to act to draw the wing and lift the slats *s* of the arm A, with which it is connected. When the rotation becomes too slow, slide *l* is drawn out by weight *m*, the resistance of the wing *g* to the air increases, causing the weight *c* to act to close the slats *s*. It will be perceived that the air-passages are necessary to the operation of the wheel.

Having thus fully described my invention, what I claim as new, and desire to secure by Letters Patent, is—

1. The combination and arrangement of the air-passages F with the peculiar devices herein fully described, for the purpose of making a self-regulating wind-wheel, as set forth.

2. The swinging wing *g* and slide *l*, arranged as set forth, and operating in the manner described.

3. The peculiar arrangement of slats *s*, cord *d*, and weight *c*, when operated in the manner and for the purpose set forth.

JOSEPH DUNKLEY.

Witnesses:

A. SMITH,

I. CAPON, Jr.